United States Patent

[11] 3,623,937

| [72] | Inventor | Glen P. Gasaway<br>Buford, Ga. |
|---|---|---|
| [21] | Appl. No. | 716,106 |
| [22] | Filed | Mar. 26, 1968 |
| [45] | Patented | Nov. 30, 1971 |
| [73] | Assignee | Johnson & Johnson |

[54] SCREEN LAMINATE
3 Claims, 4 Drawing Figs.

[52] U.S. Cl. .................................................. 161/89,
156/148, 156/306, 161/93
[51] Int. Cl. .................................................... B32b 17/04,
B32b 17/10
[50] Field of Search ........................................ 161/88, 89,
150, 92, 93, 143; 156/306, 148

[56] References Cited
UNITED STATES PATENTS

| 2,706,699 | 4/1955 | Plansoen et al. | 161/89 |
| 2,939,200 | 6/1960 | Ewing et al. | 161/143 |
| 3,072,512 | 1/1963 | Dalle | 161/92 |

Primary Examiner—Robert F. Burnett
Assistant Examiner—James J. Bell
Attorneys—John H. Tregoning, Robert L. Minier and Alexander T. Kardos ABSTRACT: This invention resides in a film-screen structure defined by a screen construction of polyvinyl chloride coated fiber glass yarn heat-bonded to a polyvinyl chloride film.

PATENTED NOV 30 1971 3,623,937

Vinyl Coat 14   Fiber Glass 16
Vinyl film 18

INVENTOR
GLEN P. GASAWAY
BY John H. Tregoning
ATTORNEY

SCREEN LAMINATE

Industry has utilized fiber glass yarn for many years and has coated this yarn with synthetics, such as polyvinyl chloride, to provide protection without noticeably limiting its flexibility, and yet providing a tough outer casing for the yarn to materially enhance its service life. Such vinyl coated fiber glass yarn may be woven into an open screening, e.g., insect screening, in many commercial operations and one surface of such screening is often laminated to a polyvinyl chloride film to provide a flexible transparent fabric which is rust and corrosion resistant and also exhibits many other desirable properties. Such a screening fabric is used in many instances around the home to protect exposed areas, such as patios and swimming pools, and for many similar protective purposes by industrial and agricultural interests.

In normal procedures, particles of polyvinyl chloride are dispersed in one of the many available art-recognized plasticizers to provide a plastisol which is applied to the surface of the fiber glass yarn and heated to fuse the vinyl, and to thus provide a flexible, protective vinyl coating. To obtain such a coating, the plastisol is heated to the softening temperature of the vinyl, e.g., about 400° F., to provide complete fusion of the vinyl particles and thus, on cooling, the toughest most durable form of polyvinyl chloride film or coating.

Present practice is to adhere the polyvinyl chloride film to one surface of an open mesh screening constructed of vinyl coated fiber glass yarn, by the use of adhesive rather than by the use of heat. To attempt to heat seal polyvinyl chloride film to such polyvinyl chloride coated fiber glass yarn would seriously impair the physical properties of the film. This is so since the heat necessary to cause the polyvinyl chloride coating on the yarn to become fluid, and thus fusible, would also effect a fluidity of the polyvinyl chloride film and, thus, with the film contiguous to one surface of the open screening, the film would sag at the interstices and the substantially uniform thickness of the film, as well as its planar character, would be destroyed. Also, since some pressure is necessary to effect bonding of the film to the coating of the yarn, and with both vinyl compositions in a somewhat fluid state, the juncture of yarn and film would define thin areas of questionable durability.

These and other disadvantages are overcome by the instant invention which provides a laminated film-screen structure defined by an open screen constructed of polyvinyl chloride coated fiber glass yarn having a polyvinyl chloride film in facewise engagement therewith and heat-bonded thereto to provide a laminated structure, exhibiting a peel strength of at least about 500 grams per inch.

The polyvinyl chloride film utilized has a thickness of from about 0.5 mils to about 5 mils. A thickness of greater than 5 mils can be utilized, however, unless unusual results are desired, the advantages afforded are sufficient with the film of up to 5 mils thickness. This film can be treated with an antibacterial agent or an antifungicidal agent and should have sufficient art-recognized stabilizers such as ultraviolet light absorbers, antioxidants, etc. to insure durability under normal outdoor conditions.

The open screening constructed of polyvinyl chloride fiber glass yarn is woven such as to have at least 6 ends and 6 picks per inch and no more than 30 ends and 30 picks per inch. Combinations of counts therebetween can be utilized as, for example, screening having a count of 18×14. A plain weave is usually used and is a most practical construction from the commercial standpoint, however, other weaves can be utilized.

The fiber glass core yarn can be from 150's single yarn (150/1/0) or 90's single yarn (90/1/0), or any combination of plyed yarns to equal these approximate diameters or to fall between these limitations. The overall diameter of the yarn sizes used for the screening can be from about 10 mils to about 13 mils and the polyvinyl coating can vary from about 30 percent to about 60 percent by weight.

The laminated film-screen structure of this invention is produced by heating a plastisol-coated yarn to a temperature of from about 275° F. to about 325° F. to effect partial fusion of said plastisol, weaving said coated yarn to effect using an open mesh screen structure, positioning a polyvinyl chloride film in facewise engagement with said screen, and exposing said screen-film combination to a temperature of from about 325° F. to about 375° F. to effect a heat-bonded laminated structure having a peel strength of between said film and said screen of at least about 500 grams per inch.

The plasticizer forming an integral part of the plastisol is absorbed by the particles of polyvinyl chloride dispersed therein and the temperature at which the vinyl becomes fluid or begins to become fluid is lowered by the plasticizer. The amount that the fusion or jelling temperature is lowered is dependent both on the particular plasticizer utilized and the amount of such plasticizer present. As the plastisol is heated, most of the plasticizer is believed to be absorbed by the vinyl particles while a certain percentage is distilled away. As the complete fusion temperature is reached, i.e., about 400° F., in the case of polyvinyl chloride, the system becomes a one phase system since the plasticizer has either been absorbed of distilled away and, on cooling, the vinyl coating thus formed is the strongest and toughest form. However, once the thus heated plastisol has been cooled and a vinyl coating has been effected, the fusion temperature, i.e., the temperature where the vinyl will become sufficiently fluid to permit fusion again, is 400° F. Therefore, the thus formed vinyl coating must be heated to about 400° F. to effect fusion between it and another structure.

By this invention, it is determined that to heat the plastisol-coated yarn to a temperature of between 275° F. and 325° F., sufficient of the plasticizer has been absorbed to lower the temperature at which fluidity of the vinyl particles begins to take place that, upon cooling, sufficient bonding between particles has taken place to provide a sufficiently film vinyl coating that will maintain its integrity while undergoing the handling and processing necessary to construct an open mesh screen of the thus-coated fiber glass yarn. However, having heated the plastisol to a temperature between about 275° F. and about 325° F., there is sufficient free plasticizer, i.e., unabsorbed plasticizer, that the softening temperature of the plastisol is still below the 400° F. fusion temperature of the vinyl film and, in fact, is between the temperature range of from about 325° F. and about 375° F. That is to say that the once set or the once partially fused vinyl coating on the fiber glass yarn, if heated to a temperature within the range of about 325° F. to about 375° F., will become sufficiently fluid to prevent fusion while still not being heated to a temperature sufficient to permit complete fusion.

The polyvinyl chloride film, which also contains plasticizer, is placed contiguous to one face of the screen which has been plastisol coated and which has had the plastisol partially fused at a temperature of from about 275° F. to about 325° F., and the combination is exposed to a temperature within the range of about 325° F. to about 375° F. in the presence of some pressure. The contiguous surfaces of both the vinyl constituents become sufficiently fluid to permit fusion and, on cooling, provides a laminated screen exhibiting a peel strength of at least about 500 grams per inch and preferably about 700 grams per inch.

The instant invention will be more readily understood by reference to the accompanying drawings wherein:

FIG. 1 presents a planar view of the laminated film-screen structure of this invention;

Figure 1:
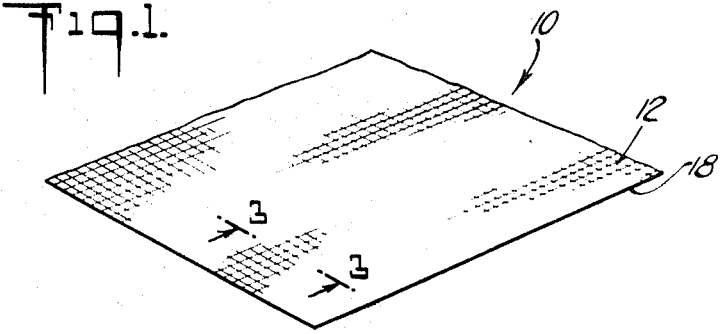

Referring to Fig. 1, there is shown a section of laminated structure 10 of this invention, which laminate is defined by the polyvinyl chloride film 18 heat-bonded to woven screening 12 constructed of polyvinyl chloride coated fiber glass yarn 14.

Figure 2:
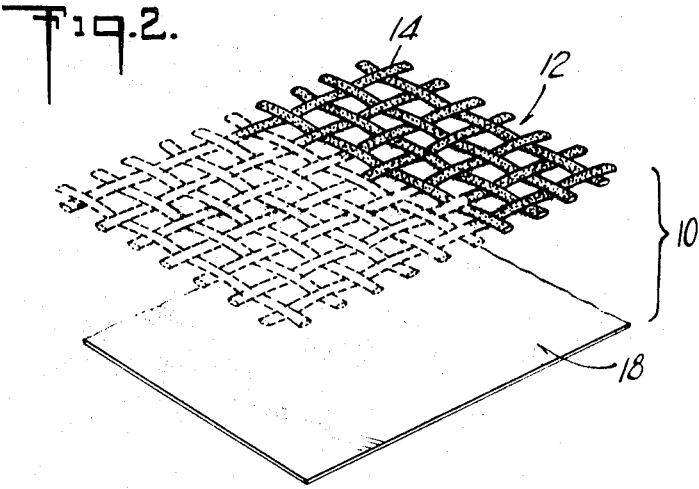
FIG. 2 is an enlarged sectional view depicting the open mesh woven screening of vinyl coated fiber glass yarn in near position for bonding above the vinyl film.

FIG. 2 depicts an enlarged view of a section of the screening 12 positioned in spaced facewise engagement to the surface of vinyl film 18 just prior to the contiguous facewise engagement necessary to facilitate heat-bonding. Note that the vinyl coated fiber glass yarns 14 are interwoven in a plain weave to provide the open mesh screening 12.

Figure 3:
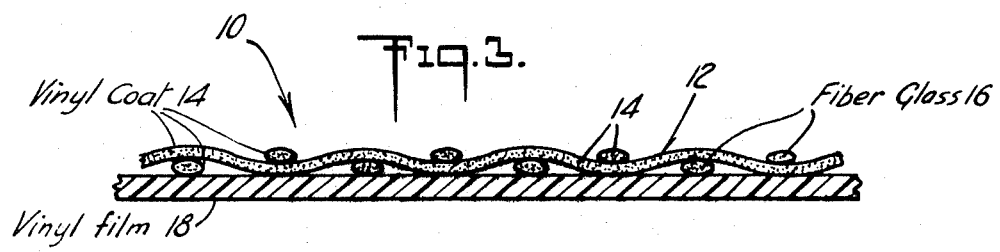
FIG. 3 is an enlarged cross section of the laminated film-screen structure taken along line 3–3 of the laminate of Fig. 1.

FIG. 3 is an enlarged cross section taken along line 3—3 of FIG. 1 just prior to application of heat thereto and the resultant bonding of the film 18 to screen 12 which are positioned in contiguous facewise engagement. The coated fiber glass yarn 14 shown in cross section exposes the multifilament fiber glass core 16, which is shown in greater detail in FIG. 4.

Figure 4:
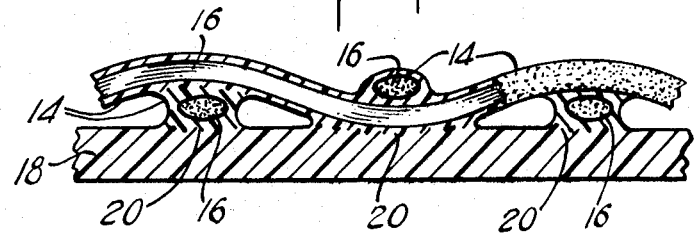
FIG. 4 is an enlarged section of the cross section depicted in Fig. 3.

The enlarged cross section of FIG. 4 which is taken along line 3—3 of FIG. 1, depicts the film-screen structure heat-bonded in contiguous facewise engagement. Note that the planar character of the film is maintained and that no depressions of thin sections are in evidence where the film 18 is joined to the yarn 14. The bond 20 between the polyvinyl chloride coating on the yarn 14 and the polyvinyl chloride film 18 is complete and represents simply the intermixing or combining of the two polyvinyl-chloride systems as by intermolecular action as opposed to mechanical bonding of the film 18 to the yarn 14 by overlapping and a clawlike grip imposed on the yarn 14 by the film 18. The vinyl coating on the yarn 14 also maintains substantially uniform character.

The composition of the plastisol is from about 25 parts to about 100 parts by weight of plasticizer per 100 parts of polyvinyl chloride resin particles. The plasticizer utilized is selected from those normally used by the art with polyvinyl chloride. Among these plasticizers, the most important are the phthalic esters, i.e., esters prepared from o-phthalic anhydride, and specific examples are di-2-ethyl hexyl phthalate, di-n-octylphthalate and isooctylphthalate. Other such plasticizers are the phosphate esters, adipic acid esters, etc., as well as the polymeric ester plasticizers and the epoxy plasticizers.

As stated earlier, art-recognized stabilizers are normally added to the polyvinyl chloride, stabilizers such as ultraviolet light absorbers, antioxidants, etc., and pigments and fillers, etc.

There are other art recognized methods of constructing a screen constructed of fiber glass yarn coated with vinyl. For example, the uncoated fiber glass yarn can be woven into an open mesh screening and the woven screening coated with plastisol and heated to effect fusion.

The invention has been described in connection with its preferred embodiments but many modifications thereof are anticipated without a departure from the inventive concept which is limited only by the scope of the appended claims.

What is claimed is:

1. A process of making a bonded, laminated, open mesh film-screen structure comprising the steps of: coating fiber glass core yarns with a polyvinyl chloride plastisol; heating said polyvinyl chloride coated fiber glass core yarns to a temperature of from about 275° F. to about 325° F. to effect a partial fusion of said polyvinyl chloride coating to said fiber glass core yarns, while leaving sufficient unabsorbed plasticizer in said plastisol whereby the softening temperature of said plastisol is in the range of from about 325° F. to about 375° F.; cooling said polyvinyl chloride coated fiber glass core yarns; weaving said polyvinyl chloride coated fiber glass core yarns into an open mesh fabric; positioning a polyvinyl chloride film in a facewise engagement with said open mesh fabric to form a laminated open mesh film-screen structure; applying pressure to said laminated open mesh film-screen structure and exposing the same to a temperature of from about 325° F. to about 375° F. to complete the fusion of said polyvinyl chloride coating to said fiber glass core yarns and to form a bonded, laminated, open mesh film-screen structure.

2. A bonded, laminated, open mesh film-screen structure made by the process of claim 1.

3. A process of making a bonded, laminated, open mesh film-screen structure comprising the steps of: coating fiber glass core yarns having an overall diameter of from about 10 mils to about 13 mils with a polyvinyl chloride plastisol containing from about 25 parts to about 100 parts of plasticizer per 100 parts of polyvinyl chloride resin, said polyvinyl chloride coating being applied to said fiber glass core yarns in an amount varying from about 30 percent to about 6 percent weight; heating said polyvinyl chloride coated fiber glass core yarns to a temperature of from about 275° F. to about 325° F. to effect a partial fusion of said polyvinyl chloride coating to said fiber glass core yarns, while leaving sufficient unabsorbed plasticizer in said plastisol whereby the softening temperature of said plastisol is in the range of from about 325° F. to about 375° F.; cooling said polyvinyl chloride coated fiber glass core yarns; weaving said polyvinyl chloride coated fiberglass core yarns into an open mesh fabric having an end count between 6 and 30 per inch and a pick count between 6 and 30 per inch; positioning a polyvinyl chloride film having a thickness of from about 0.5 mils to about 5 mils in facewise engagement with said open mesh fabric to form a laminated open mesh film-screen structure; applying pressure to said laminated open mesh film-screen structure and exposing the same to a relatively higher temperature of from about 325° F. to about 375° F. to complete the fusion of said polyvinyl chloride coating to said fiber glass core yarns and to form a bonded, laminated, open mesh film-screen structure having a peel strength of at least about 500 grams per inch.

* * * * *

PO-1050
(5/69)

UNITED STATES PATENT OFFICE
CERTIFICATE OF CORRECTION

Patent No. 3,623,937  Dated November 30, 1971

Inventor(s) Glen P. Gasaway

It is certified that error appears in the above-identified patent and that said Letters Patent are hereby corrected as shown below:

In Column 2, line 21, "of" should read ----or----.

In Column 4, line 30, "6 percent" should read ----60 percent----.

Signed and sealed this 13th day of June 1972.

(SEAL)
Attest:

EDWARD M. FLETCHER, JR.
Attesting Officer

ROBERT GOTTSCHALK
Commissioner of Patents